UNITED STATES PATENT OFFICE.

HAYDN M. BAKER, OF NEW YORK, N. Y.

IMPROVEMENT IN CLEANING CLOTHS USED BY BANK-NOTE ENGRAVERS.

Specification forming part of Letters Patent No. 74,878, dated February 25, 1868.

*To all whom it may concern:*

Be it known that I, HAYDN M. BAKER, of the city, county, and State of New York, have invented a new and useful Process for Cleansing Cloths used by Bank-Note and other Engravers, and recovering the printers' ink from the same; and I do hereby declare that the following is a full and exact description thereof.

The nature of my invention consists in dissolving the gummy portion of the ink with coal-tar, benzole, or coal-tar naphtha, or with the refined coal-tar light oils, and pressing out the coloring matter with mechanical appliances while the cloths are immersed in either of the compounds above specified.

The cloths are then removed and submitted to the action of steam in an appropriate vessel, which vessel may also contain water, with or without the addition of soap or alkalies. They then may be rinsed, pressed, and dried, and are ready for use again.

The solution of gummy matter and the undissolved coloring matter may be placed together in a distillatory apparatus, and the benzole, naphtha, or light oils distilled off, which gives back the solvent, and leaves the printers' ink in the retort. The ink may be removed and ground, and is ready for market or use again.

The advantage of this invention is, that it enables the engraver to cleanse his cloths without injury to the fiber, and at the same time to recover a large percentage of the expensive ink employed by him, which has heretofore been entirely wasted in the processes used for cleansing his cloths.

What I claim as my invention, and desire to secure by Letters Patent, is—

1. The use of coal-tar, benzole, coal-tar naphtha, or refined coal-tar light oils, for removing printers' ink from cloths or other fiber used by bank-note and other engravers.

2. The separation and recovery of the printers' ink and solvent by distillation, or any other method substantially the same.

HAYDN M. BAKER.

Witnesses:
    JOHN L. BROWER,
    JOHN ADAMS,
    OLIVER S. ACKLEY.